United States Patent

Baethge et al.

Patent Number: 5,339,228
Date of Patent: Aug. 16, 1994

[54] ESCALACOR OR MOVING WALKWAY BALUSTRADE ILLUMINATION

[75] Inventors: Frank Baethge; Lutz Klein; Ali Naghi, all of Hanover, Fed. Rep. of Germany

[73] Assignee: Otis Elevator Company, Farmington, Conn.

[21] Appl. No.: 137,451

[22] Filed: Oct. 13, 1993

[51] Int. Cl.$^5$ .............................................. F21S 3/14
[52] U.S. Cl. ................................... 362/146; 198/337; 362/268
[58] Field of Search ................... 362/31, 32, 268, 253, 362/146; 198/335, 337

[56] References Cited

U.S. PATENT DOCUMENTS

| | | | |
|---|---|---|---|
| 4,683,524 | 7/1987 | Ohta | 362/268 |
| 4,798,274 | 1/1989 | Saito | 198/337 X |
| 4,871,056 | 10/1989 | Saito | 362/335 X |
| 5,067,062 | 11/1991 | Rülke | 198/337 X |

FOREIGN PATENT DOCUMENTS 1274286 8/1968 Fed. Rep. of Germany .
97370 4/1993 Japan .

Primary Examiner—Ira S. Lazarus
Assistant Examiner—T. M. Sember

[57] ABSTRACT

The glass balustrade of an escalator or moving walkway passenger conveyor is provided with an internally illuminated rail on its side surface. The rail is illuminated by a light beam which is piped up through the interior of the balustrade panels from a light source disposed beneath the outer deck of the passenger conveyor. The light source includes a neon emitter disposed at the focal point of a parabolic mirror so as to provide a parallel band of light which is projected into a lens set. One lens narrows the band of light and the second lens produces a collimated beam from the narrowed light band. The collimated light beam is projected into the bottom of the balustrade panels. The light beam is then serially reflected up through the glass panels to the illuminated rail. The stripe is a semi-circular rod of glass which is glued onto the side of the balustrade, and is formed from a glass having substantially the same index of refraction as the balustrade panel glass.

7 Claims, 2 Drawing Sheets

ESCALACOR OR MOVING WALKWAY BALUSTRADE ILLUMINATION

TECHNICAL FIELD

This invention relates to the illumination of a specific area on a glass balustrade of a passenger conveyor.

BACKGROUND ART

Passenger conveyors such as escalators and moving walkways have been provided with balustrades made from glass panels for some time. The glass balustrades are considered to provide an elegant and aesthetically pleasing appearance, and are architecturally desirable. The use of glass balustrades has led to various systems for illuminating the balustrades, and areas around the balustrades. Examples of such illuminating systems are found in various patent publications. German Auslegeschrift No. 1,274,286 discloses an escalator with a glass balustrade which is illuminated from the area beneath the supporting structure for the balustrade panels. A neon light source is mounted directly below the glass balustrade panels between the latter and the return path of travel of the handrail. U.S. Pat. No. 4,798,274 granted Jan. 17, 1989 to C. Saito discloses an assembly for illuminating the landing area of an escalator in a manner which indicates the direction of travel of the escalator. U.S. Pat. No. 4,871,056 granted Oct. 3, 1989 to C. Saito discloses a system of illuminating the area of an escalator balustrade located directly beneath the handrail. U.S. Pat. No. 5,067,062 granted Nov. 19, 1991 to G. Riilke discloses a passenger conveyor balustrade illumination system which utilizes light sources, such as neon lights, located below the conveyor inner conveyor step skirts and outer decks which combine with lenses in the skirts and decks to project a light curtain upwardly on each side of the balustrade. The projected light curtain is then reflected downwardly toward the skirts and decks by what are called "leg members" which contain "convex mirror-like curvatures". Essentially, these are mirrors which reflect light downwardly to illuminate both sides of each of the balustrades.

From the foregoing, it will be appreciated that passenger conveyors have had their balustrades illuminated for purposes of added safety; aesthetic enhancement; conveying information; and the like.

DISCLOSURE OF THE INVENTION

This invention relates to a passenger conveyor with a glass balustrade-illuminating system which is operable to illuminate a narrow light-emitting rail that is mounted on the balustrades, preferably on the sides thereof facing the conveyor steps or treads. The system includes a light emitting source, preferably a neon light source, which is associated with a parabolic light-gathering and reflecting mirror. The parabolic mirror ensures that a major amount of the light emitted by the light source is captured for use in the invention. The light is positioned at the focal point of the parabolic mirror, so that the latter will project a parallel ray light beam. The light beam from the parabolic mirror is directed into a lens couplet which includes a positive light ray-concentrating lens which narrows and concentrates the light beam emanating from the parabolic mirror. The concentrated light beam is then passed through a collimating lens so as to produce a more concentrated parallel ray light beam. The collimated light beam is projected into the bottom of the glass balustrade panels where it is reflected internally of the balustrade up to the location of the illuminated rail on the balustrade panels. The illuminated rail is glued to the glass balustrade panels in such a manner as to provide a minimum width discontinuity between the balustrade and the rail. The rail is made from a glass which has essentially the same index of refraction as the glass balustrade panels. The outer surface of the illuminated rail is roughened so that light emitted therefrom will be diffusely scattered to brighten, and yet soften the appearance of the illuminated rail. The index of refraction of the glass used to form the balustrade panels is chosen so as to minimize light absorption at the reflecting surfaces thereof as the light beam travels up the balustrade panels to the illuminated rail. In this manner, minimal amounts of light escape the confines of the balustrade panels prior to the beam reaching the illuminated rail. In this manner, essentially all of the light from the neon emitter which is captured and reflected by the parabolic mirror is concentrated and transmitted to the illuminated rail. The only accessory equipment needed is the light emitter, the parabolic mirror, and the focusing and collimating lens couplet. The illuminated rail on the balustrade will thus direct a passenger's attention to the path of travel of the conveyor, while aesthetically enhancing the appearance of the conveyor. The rails will be visible from inside and outside of the conveyors.

It is therefore an object of this invention to provide an escalator or moving walkway passenger conveyor having glass balustrades having a specific area thereof which is illuminated by light transmitted thereto by the glass panels in the balustrade.

It is an additional object of the invention to provide a passenger conveyor of the character described wherein the illuminated balustrade area is a glass rail adhered to the glass balustrade panels.

It is a further object of the invention to provide a passenger conveyor of the character described wherein the rail illumination light is provided by a collimated light beam produced in the support area of the balustrade panels, which light beam is projected into the bottom of the balustrade panels and is thereafter progressively internally reflected by the outer surfaces of the balustrade panels to the locus of the illuminated glass rail, whereupon the light beam does not suffer from significant absorption and reflection losses so as to provide maximum illumination of the illuminated rail.

These and other objects and advantages of the invention will become more readily apparent from the following detailed description of a preferred embodiment thereof, when taken in conjunction with the accompanying drawings, in which:

BEST MODE FOR CARRYING OUT THE INVENTION

Figure 1:
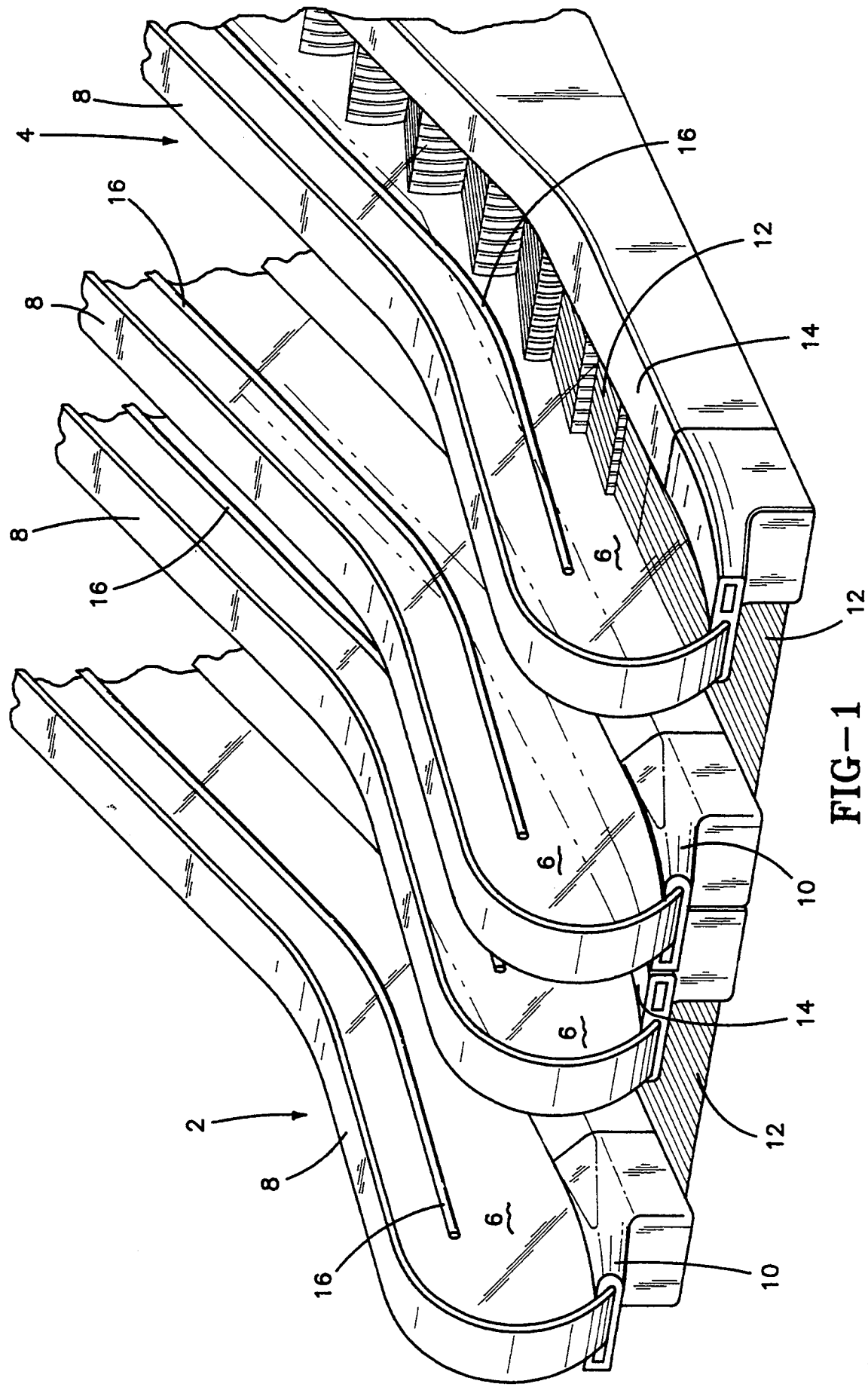
FIG. 1 is a fragmented perspective view of an escalator bank utilizing the balustrade illumination system of this invention.

Referring now to the drawings, there is shown in FIG. 1 a typical ascending and descending bank of escalators which have the illumination system of this invention incorporated therein. Each of the escalators 2 and 4 has a pair of balustrades 6 which are formed from glass panels. Handrails 8 move along the balustrades 6. Inner skirt panels 10 flank the escalator steps 12, and outer deck panels 14 are disposed on the sides of the balustrades 6 away from the steps 12. Each of the balustrades 6 is provided with an internally illuminated rail 16 which is glued to the surface of the balustrades 6 facing the steps 12.

Figure 2:
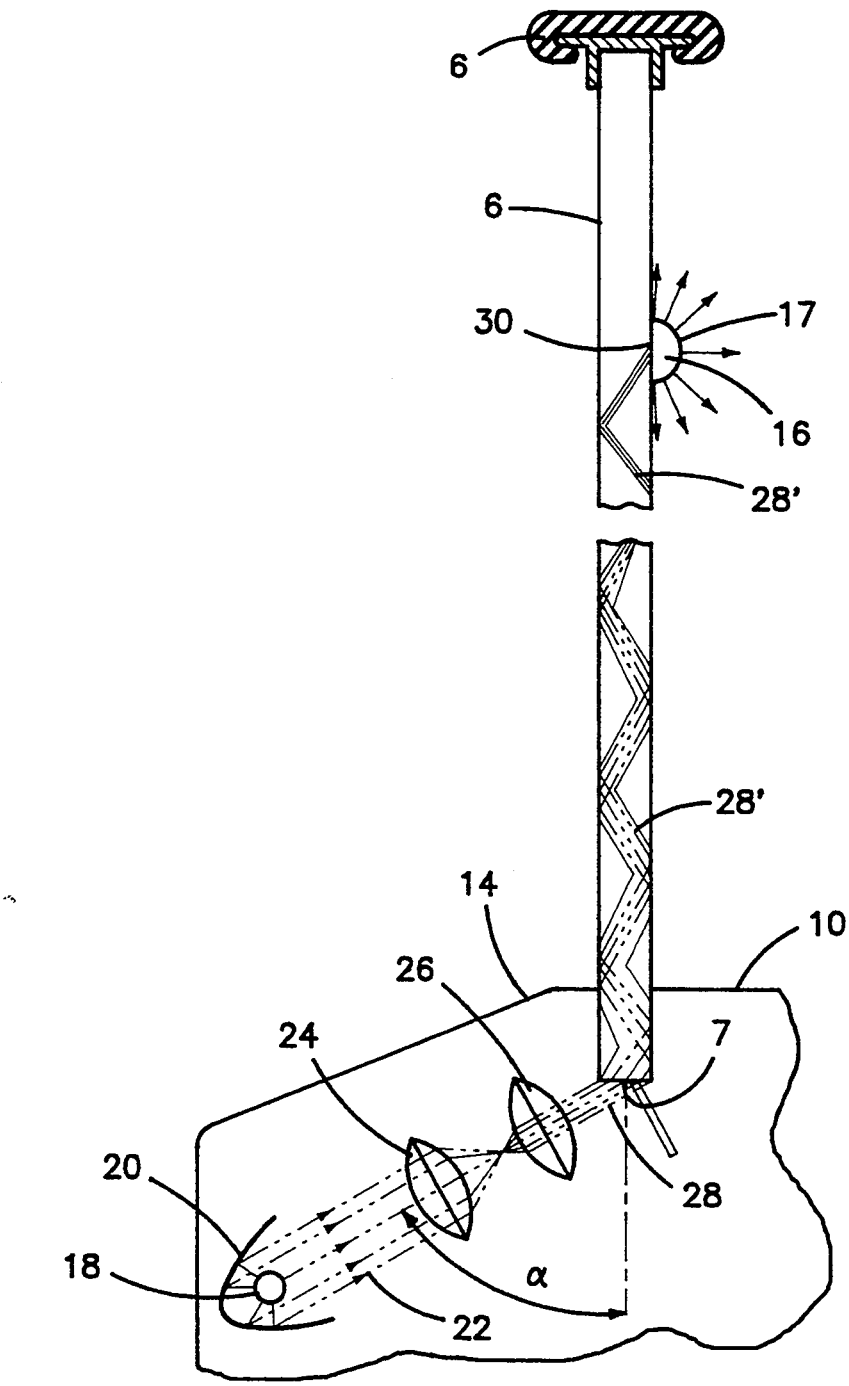
FIG. 2 is a somewhat schematic sectional view of the balustrade assembly depicting the manner in which the light beam is created and projected to the illuminated balustrade rail.

FIG. 2 is a somewhat schematic view of the balustrade 6, skirts 10 and decks 14, showing the manner in which the rail 16 is illuminated from within. Beneath the outer deck panels 14 there is mounted a light emitter such as a neon tube 18 or a series thereof. A parabolic mirror 20 is disposed adjacent to the tube 18 so that the axis of the tube 18 is disposed at the focal point of the mirror 20. The mirror 20 gathers light from the tube 18 and reflects said light in parallel rays 22 to a focusing lens 24 which narrows and concentrates the light beam from the mirror 20. The narrowed and concentrated light beam is then passed through a collimating lens 26 which produces a narrowed beam 28 of parallel light rays. The light beam 28 is directed at the bottom surface 7 of the glass balustrade 6 where it will be refracted into the interior of the balustrade 6. Care should be taken to ensure that the diameter of the light beam 28 is not so large as to project light rays therein past the balustrade 6, or onto the side thereof facing the lens 26, taking into account the angle of incidence $\alpha$ at which the light beam 28 strikes the bottom surface 7 of the balustrade 6. The diameter of the light beam 28 can be properly controlled by properly spacing the lens 26 relative to the focal point of the lens 24. It will be appreciated that moving the lens 26 closer to the focal point of the lens 24 will result in a lessening of the diameter or width of the light beam 28. Once the light beam 28 is refracted into the balustrade 6, the beam will be reflected back into the balustrade 6 as shown by the numeral 28'. In this manner minimal light from the beam 28 will escape from the balustrade 6 as the beam is reflected back and forth up through the balustrade 6. The rail 16 to be illuminated will be properly located along line 30 on the balustrade 6 which coincides with an area on the balustrade 6 that the reflected light beam 28' will strike. When the light beam 28' reaches the location 30, it will be refracted into the glass rail 16 and will then be refracted out through the curved surface 17 of the rail 16. The rail 16 is thus illuminated on the otherwise non-illuminated balustrade.

The glass rail 16 will preferably have a roughened outer surface so as to disperse the light refracted through the surface 17 in all directions. The glass from which the rail 16 is made may be colored glass for enhanced appearance. In order to minimize light reflected back into the balustrade 6 at line 30, the rail 16 should be closely adjacent to the balustrade surface with a minimal glass-to-glass gap. The refractive index of the glass in the balustrade and the glass in the rail should be as nearly equal as possible. In order to eliminate light losses at the reflection points along the balustrade, the angle of incidence $I''$ of the light beam must be greater than the critical angle $I'$ in accordance with the following:

$I'' > I'$ where $I' = \sin I/n$; and $I = 90°$ for a glass plate; and $n = 1.52$, the index of refraction for glass.

It will be readily appreciated that the balustrade illumination system of this invention is of simple construction and is contained inside of the outer deck assembly on the escalator or moving walkway. The illuminating light beam is properly concentrated and directed into the glass balustrade panels where it is reflected upwardly to the glass rail to be illuminated. Minimal light can escape from the balustrade prior to the glass rail so that the balustrade panels do not appear to be illuminated to passengers. The glass rail may be colored, and preferably has a toughened external surface for maximum dispersion of light refracted through its surface.

Since many changes and variations of the disclosed embodiment of the invention may be made without departing from the inventive concept, it is not intended to limit the invention otherwise than as required by the appended claims.

What is claimed is:

1. An illumination system for an escalator or moving walkway, said system comprising:
    a) a glass balustrade;
    b) an inner and outer deck assembly flanking a lower end portion of said glass balustrade with a bottom surface of said balustrade being disposed within said deck assembly;
    c) a light source disposed in said deck assembly in close proximity with said bottom surface of said balustrade;
    d) light gathering means adjacent to said light source and operable to provide a parallel ray light beam and direct said light beam toward said bottom surface of said balustrade at an angle of incidence which results in light from said light beam being refracted into the interior of said glass balustrade;
    e) a light-refracting rail disposed on a surface of said glass balustrade at a location spaced upwardly away from said bottom surface of said balustrade; and
    f) said glass balustrade providing means for reflecting said light beam internally of said glass balustrade, and refracting said light beam into said light-refracting rail to differentially illuminate said rail on said glass balustrade.

2. The illumination system of claim 1 further comprising lens means interposed between said light gathering means and said bottom surface of said balustrade for focusing and narrowing said light beam.

3. The illumination system of claim 2 wherein said lens means includes a collimating lens for producing a parallel ray light beam directed into said bottom surface of said balustrade.

4. The illumination system of claim 1 wherein said light-refracting rail is formed from a glass having substantially the same index of refraction as said glass balustrade.

5. The illumination system of claim 4 wherein said light-refracting rail has an exterior roughened surface for diffusely refracting light therethrough.

6. The illumination system of claim 1 wherein said light gathering means is a parabolic mirror.

7. The illumination device of claim 3 wherein said collimating lens is positioned relative to a focal point after said lens means.

* * * * *